May 25, 1965  N. C. THUESEN  3,185,139
VALVE-RECIPROCATING CAGE WITH GUIDE MEANS THEREFOR
Filed Jan. 25, 1965
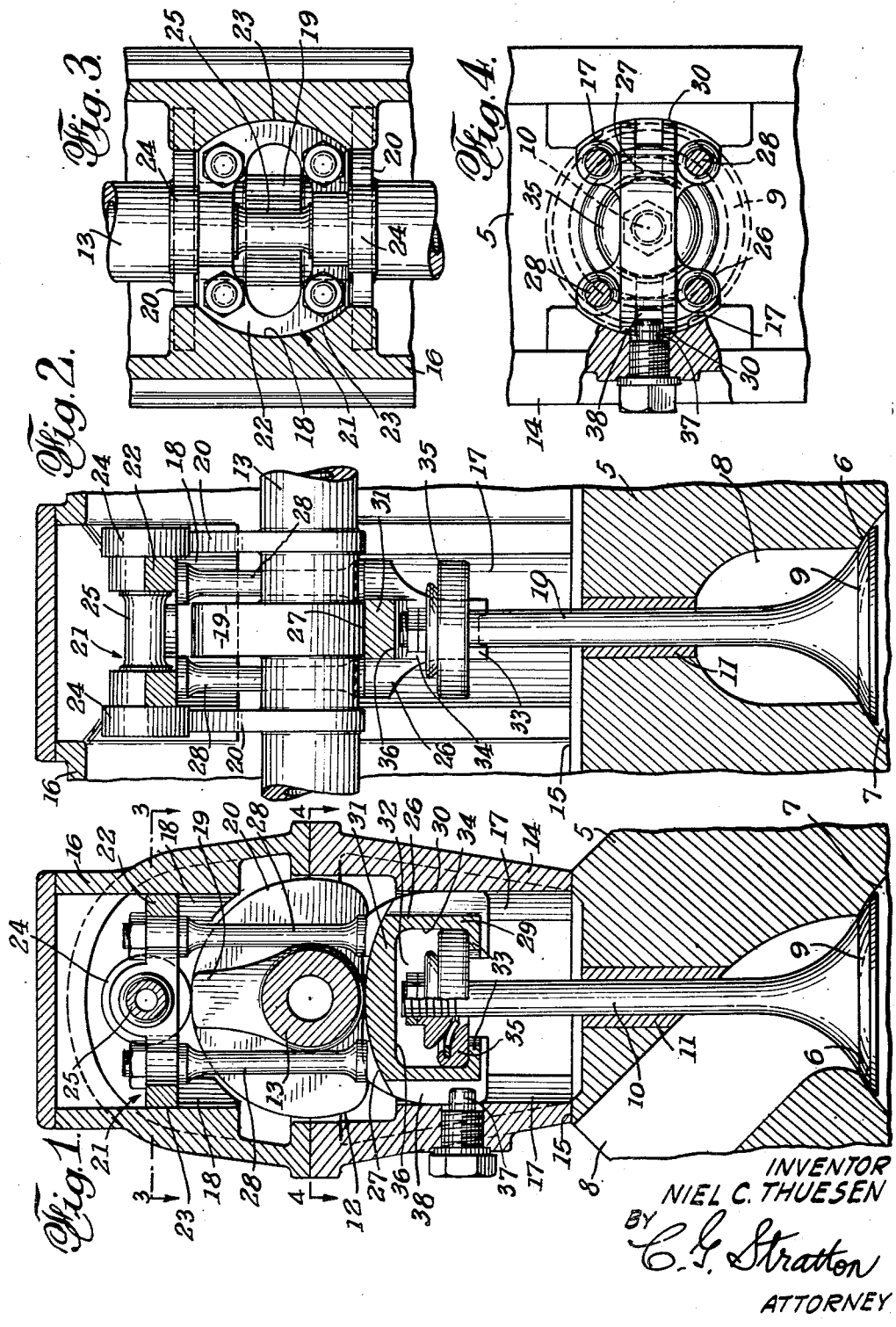
INVENTOR
NIEL C. THUESEN
BY
C. G. Stratton
ATTORNEY

United States Patent Office 3,185,139
Patented May 25, 1965

---

3,185,139
VALVE-RECIPROCATING CAGE WITH GUIDE MEANS THEREFOR
Niel C. Thuesen, 6021 Compton Ave., Los Angeles, Calif.
Filed Jan. 25, 1965, Ser. No. 427,738
7 Claims. (Cl. 123—90)

This invention relates to a cage for reciprocating a poppet valve and more particularly to means for guiding said cage.

Such a valve-moving cage, when reciprocated by complementary or reciprocal cam means, is subject to direct control by the cams of such means, one said cam having direct operative control of the cage to move the same in a direction to open the poppet valve, and the other cam having direct operative control of the cage to move the same in the opposite or poppet-closing direction. At the points of reversal of the reciprocative movements of the cage, there are transitions of control from one cam to the other, at which times the engagements of the cams with the cage are not positive but rather entail slight clearances releasing the cams from the cage.

An object of the present invention is to provide means to control or guide the cage during the periods of release thereof from the complementary cams that reciprocate the cage and the poppet valve moved thereby, thereby providing for aligned movement of the cage both when engaged with the cams and during engagement transition from one cam to the other.

Such cams are ordinarily provided on an overhead cam shaft with the cam means on said shaft between longitudinally spaced inner and outer cage parts. The cams being rotational and effecting straight-line reciprocation of the cage, subject the spaced cage parts, alternately, to forces that are sometimes on the axis of the poppet valve and sometimes offset from said axis. Also, since the cam means comprise two cams, one for raising and one for lowering the cage, and since but one said cam can be located on the axis of the valve, the other necessarily having a location laterally of said axis, the offset cam at no time applies its cage-moving force on the axis of the valve. Further, in order to bring the mechanism into balance or symmetry relative to the valve axis, two laterally offset cams, one on each side of the valve axis, are provided. This restoration of balance of the mechanism provides two points of operative engagement of the offset cams with the cage. Should one point of engagement occur earlier than the other, the forces applied to the cage would be at an angle to the axis of the valve.

Accordingly, another object of the invention is to provide slide-guiding means that so aligns the cage that the same smoothly reciprocates in slideways provided for the inner and outer parts of the cage.

A further object of the invention is to provide slide and guide means for a poppet-moving cage that is formed to greatly facilitate assembly of the cage in a housing in which the slide and guide means are provided.

This invention also has for its objects to provide such means that are positive in operation, convenient in use, easily installed in a working position and easily disconnected therefrom, economical of manufacture, relatively simple, and of general superiority and serviceability.

The foregoing objects are realized in a construction that comprises a cage that is reciprocated by rotational complementary or reciprocal cam means to move a poppet valve toward and from seated position controlling flow in a port. The cam means is provided on a cam shaft located between an outer cage part and an inner tappet part, the latter being connected to the poppet valve. Said two parts are guided in aligned bores in the housing, said bores, at least partly, being cylindrical and having sliding engagement with cylindrical faces of the two cage parts.

The cage parts are connected by a set of four rods, by means of which, said parts may be assembled, one above and one below the cam shaft, after the inner cage part has been connected to the poppet valve, movement of which is controlled by the cam means. The assembled cage is capable of rotative movement around the axis of the valve which imparts thereto free adjustability under forces imparted by the cams of the reciprocal cam means that are laterally disposed with respect to the valve axis.

Slide-guide means, engaged with the inner or tappet part of the cage, may be applied after the cage assembly to provide broad-tolerance alignment of the cage for smooth reciprocation thereof in the cylindrical slideway bores above mentioned.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a vertical sectional view of a poppet valve mechanism with a valve-reciprocating cage and guide means of the present invention, and shown with the valve closed.

FIG. 2 is a vertical sectional view of the mechanism shown in FIG. 2 and taken on the valve axis.

FIGS. 3 and 4 are cross-sectional views as taken respectively on the lines 3—3 and 4—4 of FIG. 1.

While shown vertically to conserve space on the drawing, the mechanism that is illustrated, in V-motors, would be disposed at a 45° angle preferably with the upper or outer end slanted toward the left.

The drawing shows a portion of a cylinder block 5 of an internal combustion engine or the like, a valve seat 6 in said block for communicating, when open, a cylinder chamber 7 in the block and a flow passage 8 that may be an exhaust or intake passage. A poppet valve 9, with a stem 10 that is guided in a bushing 11 in said block 5, controls the port defined by the valve seat 6 by being reciprocated by cam means 12 on a cam shaft 13 that is in an overhead position relative to the engine block 5. An inner or lower housing 14 is mounted on a face 15 of said block between the cam shaft and the block, and an outer or upper housing 16 is carried by the housing 14 above and around the cam means 12. Aligned cylindrical bores 17 and 18 are respectively formed in said housings 14 and 16; both said bores are shown as having opposed partial guide walls. FIGS. 3 and 4 best show these guide walls. Gang-boring will insure alignment of the bores, especially when the housings 14 and 16 are inter-fitted with suitable dowel or locating pins.

It will be noted that the cam means 12 comprises a valve-opening cam 19 which is located on the axis of the valve 9 and rotates on the axis of the cam shaft 13 which intersects the valve axis. Said means 12 also comprises a pair of valve-closing cams 20 that are complementary or reciprocal to the cam 19 and, necessarily, are spaced apart on each side of cam 19, as shown in FIG. 2.

A cage 21 is operatively associated with the cams 19 and 20 and is reciprocated thereby. Said cage comprises an outer part 22 that has opposite cylindrical faces 23 that have a sliding fit in the bore 18, the fit being also one that allows rotational movement of the cage part 22. Aligned with and engaged by the valve-lifting cams 20 are cam followers 24 in the form of anti-friction bearings mounted on a transverse shaft 25 journalled in bearings provided in said cage part. Said cage also comprises a tappet or inner part 26 that is provided with an outer convex surface 27 that is engaged by the lobe of cam 19 to move said part 26 and, therefore, the cage 21 in valve-opening direction.

Said cage parts 22 and 26 are connected by a set of four rods 28, two straddling the cam shaft between the cam 19 and one of the cams 20 and two straddling the cam shaft between the cam 19 and the other of the cams 20.

The tappet part 26 of the cage 21 is formed to have side walls 29 that have opposite cylindrical faces 30 that have a sliding fit in the bore 17, the fit also being one that allows rotational movement of said tappet part. An end wall 31 on the outer side of which the convex surface 27 is formed connects the outer ends of the side walls 29 thereby forming a space 32 that is open at the inner end. Ledges 33 extend toward each other from the inner ends of the walls 29 which have opposite parallel, flat faces 34.

Compression-compensating means 35 is mounted on the outer end of the valve stem 10, resides in the space 32, and has operative engagement with the face 36 of end wall 31 and the opposed faces of the ledges 33. Said means 35 normally holds the end of the stem 10 against face 36 and, when the valve 9 is seated against the seat 6, the cams 20 move the cage 21 to a position that places the means 35 under compression against the ledges 33, thereby retracting said valve end 10 from engagement with surface 36, and enabling the valve 10 to seat firmly against the resilient compression of the compression-compensating means.

It will be clear that two cams 20 are necessary because of the laterally displaced position of these valve-closing cams. To use but one would produce an unbalanced imposition of forces on the cage. It will also be clear that it is not a practical possibility to make the cams 20 and mount the cam followers 24 with such accuracy that said cams will engage the followers at exactly the same time. If slideways for said cage parts 22 and 26 were provided such that the same hold the cage non-rotationally, any sequential engagement between the cams 20 and the followers 24 will cause the cage to be subjected to a momentary force causing or tending to cause rotation of the cage. In most instances, this will cause the cage to momentarily bind on its guideways and interrupt the desired smooth reciprocation of the cage. While but an instantaneous interruption, the resulting wear will become increasingly greater and the efficiency of the operation will become materially impaired. The high speeds at which such valves, in internal combustion engines, move, greatly magnify the deleterious effects of machined slideways that render rotational adaptation to an uneven imposition of forces on the cage undesirable.

According to the present invention, the cage 21 has freedom to turn in the cylindrical guides 17 and 18 and provisions are made to limit this turning tendency within practical tolerance limits. To this end, a stud 37, carried by the housing 14, is entered in a longitudinal slideway 38 in one of the side walls 29 of the tappet part 26 of the cage. Tolerance of fit of said stud in the slideway may be several thousandths of an inch, the same allowing rotational adjustability of the cage in the bores 17 and 18 and yet obviating binding such that smooth cage reciprocation cannot be had. The stud limits the rotation of the cage within such narrow limits that the engagement of the faces of the cams 19 and 20 with the faces of followers 24 and face 27 remains normal and obviates undue wear such as would result from an abnormal or angular engagement of said faces.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. Poppet valve mechanism having a rotating cam shaft with reciprocal cams for moving the valve between open and closed positions, said mechanism comprising:
   (a) a cage connected to said valve and having opposite longitudinal cylindrical faces, said cage comprising inner and outer parts on opposite sides of the cam shaft with a set of rods connecting said parts,
   (b) one of said cams being disposed in a plane coinciding with the axis of the poppet valve and engaged with the inner cage part to move the same in valve-opening direction,
   (c) the reciprocal cams being disposed laterally on either side of said one cam and engaged with lateral portions of the outer cage part to move the same in valve-closing direction,
   (d) a fixed housing provided with longitudinal cylindrical bore faces reciprocatively and rotationally engaged with the mentioned cylindrical faces of the cage, and
   (e) means carried by the housing and having engagement with the inner cage part to slidingly guide and rotationally limit the movement of said cage part.

2. Poppet valve mechanism according to claim 1 in which the inner cage part is provided with an outwardly facing convex surface residing in the plane of the cam that is on the axis of the valve.

3. Poppet valve mechanism according to claim 1 in which the outer cage part is provided with two follower rollers on an axis transverse to the planes of the reciprocal cams and respectively in register with said latter cams.

4. Poppet valve mechanism according to claim 1 in which the mentioned bore faces are aligned on the axis of the valve.

5. Poppet valve mechanism having a rotating cam shaft with reciprocal cams for moving the valve between open and closed positions, said mechanism comprising:
   (a) a cage connected to said valve and having opposite longitudinal cylindrical faces, said cage comprising inner and outer parts on opposite sides of the cam shaft with a set of rods connecting said parts,
   (b) one of said cams being disposed in a plane coinciding with the axis of the poppet valve and engaged with the inner cage part to move the same in valve-opening direction,
   (c) the reciprocal cams being disposed laterally on either side of said one cam and engaged with lateral portions of the outer cage part to move the same in valve-closing direction,
   (d) a fixed housing provided with longitudinal cylindrical bore faces reciprocatively and rotationally engaged with the mentioned cylindrical faces of the cage,
   (e) the inner cage part being provided with oppositely disposed longitudinal slide grooves, and
   (f) a stud carried by said housing and extending into said groove to slidingly guide and rotationally limit the movement of said latter cage part.

6. In poppet valve mechanism:
(a) a cam-driven valve-carrying cage having longitudinal, transversely curved opposite faces generated on a center coinciding with the axis of the poppet valve,
(b) a housing around said cage and provided with longitudinal and similarly transversely curved faces having sliding and rotational fit with the transversely curved faces of the cage, and
(c) means carried by the housing and having engagement with the cage to slidingly guide and rotationally limit the movement thereof.

7. In a poppet valve according to claim 6, said means comprising a longitudinal slideway in the cage, and a stud extending from the housing into said slideway to slidingly guide and rotationally limit the movement of the cage.

References Cited by the Examiner
UNITED STATES PATENTS

| | | |
|---|---|---|
| 487,895 | 12/92 | Stanwood. |
| 1,074,121 | 9/13 | Kelly _____ 123—90 |
| 1,666,709 | 4/28 | Loud. |
| 2,508,557 | 5/50 | Wood _____ 74—569 |

FOREIGN PATENTS

| | | |
|---|---|---|
| 317,692 | 8/29 | Great Britain. |
| 602,202 | 5/48 | Great Britain. |

FRED E. ENGELTHALER, *Primary Examiner.*